2,871,219
Patented Jan. 27, 1959

2,871,219
SOLID POLYMERS OF EPICHLOROHYDRIN

Joseph M. Baggett, Freeport, and Malcolm E. Pruitt, Lake Jackson, Tex., assignors to The Dow Chemical Company, Midland, Mich., a corporation of Delaware No Drawing. Application April 11, 1955
Serial No. 500,653

14 Claims. (Cl. 260—45.95)

This invention relates to solid polymers of epichlorohydrin.

As is well known, ethylene oxide may be polymerized to a variety of useful products which range from oily liquids to wax-like solids, depending on the degree of polymerization. The same is true of isobutylene oxide which, in the presence of boron trifluoride, is rapidly converted to a white wax. Quite in contrast, epichlorohydrin (3-chloro-1,2-epoxypropane) has heretofore shown little or no tendency to form solid polymers. Epichlorohydrin is known to polymerize rapidly in the presence of alkalies or acids, and even explosively with Friedel-Crafts catalysts such as stannic chloride or ferric chloride. The only approach to a solid polymer seems to have been that disclosed in British specification 477,843, wherein a sticky resin was obtained from epichlorohydrin polymerized by boron fluoride. As will be more clearly pointed out below, the products of our invention are quite different substances.

In the present invention it has been found that, by using certain iron compounds as catalysts, epichlorohydrin may be converted in good yield to solid polymers having melting points above 100° C., often exceeding 135° C., and having intrinsic viscosities of about 0.44 to about 0.68 in 1,4-dioxane at 75° C. These polymers are colorless to white resinous products with considerable crystallinity, and have specific gravities above 1.20. They are insoluble in and resistant to water, aqueous acids and alkalies, and most common solvents such as aromatic hydrocarbons and oxygenated organic solvents. They are sparingly soluble to insoluble in hot acetone and are soluble in hot 1,4-dioxane and certain hot chlorinated hydrocarbons. They may be molded into a variety of useful objects, and also may be employed as film-forming ingredients in coating compositions. They may also be molded or cast into clear, colorless films of good dielectric properties, high strength and good resistance to tearing. When films of the polymers are stretched at slightly elevated temperatures there is marked increase in strength and the resulting products exhibit a high degree of crystalline orientation in the direction of stretching. The films have value as wrapping materials.

The solid polymers of the invention may be made either by the homopolymerization of epichlorohydrin or by its copolymerization with less than an equal proportion by weight of another organic epoxide. Of the latter, ethylene oxide, 1,2-propylene oxide, isobutylene oxide, 1,2-epoxybutane, the two 2,3-epoxybutanes, and styrene oxide (phenyl ethylene oxide) have all been found suitable. Polymerization may be carried out en masse or in a non-aqueous inert solvent or suspending medium.

The high molecular weight solid epichlorohydrin homo- and co-polymers, while stable in diffused light, in some instances become brittle on prolonged exposure to direct sunlight or ultraviolet radiation. This tendency may be offset by incorporating in the polymer a small proportion of a conventional antioxidant of the type used for stabilizing rubber, i. e. a phenol, aromatic amine, or metal salt of a fatty acid.

The catalysts employed in making solid epichlorohydrin polymers according to the invention are all compounds of iron, mainly those in which the iron is present as a hydrate or other coordination complex. Among the preferred catalysts are a number of apparently novel complex compounds made by the controlled reaction of an anhydrous ferric halide, such as ferric chloride, with a limited amount of a cyclic oxide such as 1,2-propylene oxide, trimethylene oxide, or 2,3-epoxybutane. Other satisfactory catalysts are various iron-containing hydrates, namely ferric hydroxide (hydrated ferric oxide $(Fe(OH)_3)$), basic ferric acetate $(Fe(OH)(C_2H_3O_2)_2)$, ferric chloride hexahydrate $(FeCl_3.6H_2O)$, and ferrous chloride tetrahydrate $(FeCl_2.4H_2O)$. Anhydrous ferric bromide is also operable. However, not all iron compounds may be used. Thus, powdered iron, ferric fluoride, hydrated ferric sulfate, and ferric nitrate nonahydrate appear to be without catalytic effect. On the other hand anhydrous ferric chloride alone is too violent a catalyst, leading to formation of decomposition products or to rapid polymerization of epichlorohydrin with formation only of liquid polymers of the type heretofore known.

As stated, among the preferred catalysts are condensates of propylene oxide with anhydrous ferric chloride. These appear to be mixtures of complex salts containing these two components in definite molecular ratios. Analyses and conductiometric studies have tentatively identified the complexes as probably mixtures of $2FeCl_3.C_3H_6O$, $FeCl_3.C_3H_6O$, $FeCl_3.2C_3H_6O$, and $FeCl_3.3C_3H_6O$. These catalysts are made by adding propylene oxide very gradually with agitation to a body of anhydrous ferric chloride until vigorous exothermic reaction ceases. The temperature is maintained between —80° C. and +60° C., preferably below 30° C., by supplying cooling and by limiting the rate of adding propylene oxide to avoid overheating. The process is stopped when the addition of a further small proportion of propylene oxide results in no further immediate evolution of heat, a point usually reached when from 2 to 3 moles of propylene oxide have been added per mole of ferric chloride $(FeCl_3)$.

To insure good temperature control during formation of the complex catalyst, the condensation is preferably carried out in the presence of an inert non-aqueous diluent medium. The latter may be either a solvent for the anhydrous ferric chloride, such as diethyl ether, or may be a non-solvent suspending medium such as n-hexane. The complex catalyst may, after condensation is complete, be used as produced, or may be purified and isolated as a solid by additional treatment. Further details of these catalysts, and their preparation, purification and use, are given in our copending patent application Serial No. 291,965, filed June 5, 1952, now issued as Patent No. 2,706,181, where such subject matter is claimed.

The epichlorohydrin and other olefin oxide monomers polymerized in the invention need be only of ordinary commercial purity and may contain up to 0.1 percent water and aldehyde or less without serious disadvantage. Where monomer of extreme purity is desired, traces of water may be removed by contacting the epichlorohydrin with anhydrous calcium sulfate for an hour or two, and then distilling. Alternatively, the water may be removed by fractional distillation in the form of a water-epichlorohydrin azeotrope. If aldehyde impurities are present, they may be removed by washing the epichlorohydrin or alkylene oxide with dilute aqueous sodium bisulfite prior to the water removal step.

In making solid polymers and copolymers of epichlorohydrin according to the invention, the monomer or mixtures of monomers and the catalyst may simply be charged together into a closed vessel and heated until polymerization is complete. The mixture is advantageously agitated during polymerization. The proportion of catalyst used is satisfactorily from 0.5 to 5 percent by weight of the oxide to be polymerized, preferably 3 to 5 percent. The optimum proportion of catalyst is approximately 4 percent by weight of the oxide. Polymerization temperature is in the range of 30° to 180° C., with 80° to 100° C. being preferred, and 80° about the optimum. Below 70° the polymerization time becomes unduly long, whereas at much above 100° C. the yield of high molecular weight polymer is reduced. Within the 30° to 180° C. temperature range, the polymerization time may vary from 18 hours upward, the shorter time being at the higher temperatures. In the preferred range of 80° to 100° C., a time of 40 to 90 hours is usually sufficient to insure practical completion of the reaction, with 72 hours being about the optimum.

Instead of effecting mass polymerization as just described, the procedure may be carried out with the epichlorohydrin monomer, catalyst and product all dissolved or suspended in an inert diluent. In general, roughly equal proportions of monomer and diluent are used. Preferred diluents are diethyl ether, diisopropyl ether, petroleum ether, benzene, and n-hexane. It is advantageous to choose a solvent which boils at about polymerization temperature, and to heat the mixture to induce gentle reflux, thereby insuring close control of temperatures. The presence of a diluent or co-monomer reduces the rate of polymerization.

The crude product resulting from the polymerization or co-polymerization process, in addition to containing the desired solid resin, also contains whatever liquid polymers may have formed, residual oxide monomer, such diluent as was employed, and catalyst residue. This crude material is first warmed and subjected to reduced pressure if necessary to vaporize off the unreacted monomer and the diluent. The resulting product, a tough hard mass of brown color, is treated in any convenient way to remove the iron-containing catalyst and to separate the desired solid resin from liquid polymer present. Preferably, the hard mass is dissolved in several volumes of solvent for the polymer, e. g. hot 1,4-dioxane, and the solution acidified, as with hydrochloric acid, to convert the iron-containing catalyst to soluble iron salts. Alcohol or water is then added slowly to the hot solution until polymer begins to precipitate, whereupon the clear yellow solution is chilled to a temperature sufficiently low to cause the solid polymer present to crystallize out of the solution, e. g. below 15° C. The crystalline material may then be further purified by recrystallization from 1,4-dioxane, yielding white solid polymer having a molecular weight sufficiently high that its softening point is over 100° C.

The purified white solid polymer or copolymer of epichlorohydrin, while useful per se, is preferably stabilized against decomposition on aging by incorporating therein a small proportion of an antioxidant of the type used in rubber compounding, i. e. a phenol, aromatic amine, or metal salt of a fatty acid such as barium laurate, cadmium laurate, or mixtures thereof.

Among the stabilizers which have been used satisfactorily are such phenols as 4,4'-isopropylidene diphenol (Bisphenol A), 4,4'-isopropylidene di-o-cresol (Bisphenol C), 4,4'-isopropylidene di(o-isopropyl phenol) (Bisphenol G), 2,2'-dihydroxy 4,4'-dichlorodiphenyl methane, hydroquinone monobenzyl ether (Agerite alba), 2,6-ditertiary butyl-4-methyl phenol (Ionol), 2,2-methylenebis (4-methyl-6-tertiary butyl phenol) (Antioxidant 2246), N-p-hydroxy phenyl morpholine (Solux), various aryl oxy ketones (Flectol White), and condensation products of beta naphthol with organic bases (Albasan). Also used have been such aromatic amines as sym. di-betanaphthyl-para-phenylene diamine (Agerite White), phenyl beta naphthyl amine (Agerite powder and Neozone D), polymerized trimethyl dihydroquinoline (Agerite Resin D), ketone-diamine condensates (Aminox), and condensates of aniline and acetone (Flectol). Other stabilizers which have been used are cadmium laurate (Harshaw Stabilizer 28–V–2), co-precipitated cadmium-barium laurate (Harshaw Stabilizer 128–V–5), and co-precipitated cadmium barium laurate with added chelating agent and epoxy scavenger (Harshaw Stabilizer 12–V–5). The antioxidant is usually added in a proportion from 0.5 to 2 percent by weight of the solid polymer. It is most conveniently introduced by mechanically mixing it into the solid resin, or by melting the latter, adding the stabilizer, and resolidifying the mixture by cooling. It may also be incorporated during the purification treatment by dissolving the antioxidant in the solvent from which the solid epichlorohydrin resin is being recrystallized. Another procedure is to mix the stabilizer into the resin immediately after recrystallization, while it is still softened with solvent.

The solid epichlorohydrin polymers and copolymers of the invention may readily be fabricated into films by conventional film-casting techniques, or by extrusion through a slit. In film-casting, the polymer is dissolved in a volatile solvent, such as dioxane, and the solution is flowed onto a smooth flat surface. After evaporation of the solvent, a clear film may be stripped from the surface. The film may be stretched, when warm, by applying tension, and will extend readily to a limit of about 150 percent elongation. Above this value, further stretching involves elastic deformation and the force required for extension increases very rapidly. When the film has been stretched to this limit it is found to exhibit crystalline orientation in the plane of the film, the crystallites being oriented in the direction of stretching.

The solid resinous products of the invention may also be molded into films and other useful objects by the application of pressure and slight heat.

The following examples will further illustrate the invention, but are not to be construed as limiting its scope.

Example 1

A complex catalyst was prepared by dissolving 120 lbs. of anhydrous ferric chloride in 110 lbs. of diethyl ether and adding gradually 250 lbs. of liquid propylene oxide while stirring and cooling to keep the temperature below 60° C. When condensation ceased, the product was warmed under vacuum to remove volatile matter, leaving a tarry black residue.

A 2 lb. quantity of this catalyst residue was charged into a steam-jacketed kettle together with 50 lbs. of liquid epichlorohydrin. The mixture was heated at 80° C. for 122 hours. There was obtained 50 lbs. of a hard, brown, solid polymer. Another charge of 50 lbs. epichlorohydrin containing 2 lbs. of catalyst was heated at 80° C. for 152 hours, again yielding 50 lbs. of hard, brown solid. The polymeric products from both runs were combined, dissolved in hot 1,4-dioxane, and sufficient concentrated hydrochloric acid was added to convert the iron-complex present to soluble ferric chloride. 44.5 gal. of methanol was then added to the hot solution with stirring. The entire mixture was cooled to room temperature, whereupon a solid polymer crystallized out of solution and was separated by filtration. This polymer was then washed with methanol, redissolved in 25 gal. of hot 1,4-dioxane, and reprecipitated with 25 gal. of methanol. The solid polymer was again filtered off and subjected to a final washing with methanol containing Bisphenol A, there being finally obtained 30 lbs. of a fluffy white solid.

The white solid had a specific gravity of 1.28 and a melting point of 120° C. It was soluble in hot 1,4-dioxane, hot dichlorobenzene, hot ethylene dichloride, hot toluene, hot carbon tetrachloride and hot ethyl acetate. It did not dissolve, but swelled slightly in hot acetone, toluene, benzene, and was insoluble in hexane, alcohols, and 5 percent acetic acid. It was resistant to water and to aqueous acids and alkalies. A 0.58 percent by weight solution of the polymer in 1,4-dioxane had a viscosity at 25° C. of 1.88 centistokes, corresponding to a specific viscosity of 0.62. The intrinsic viscosity of the polymer was 0.75 in 1,4-dioxane at 25° C. and 0.58 in 1,4-dioxane at 75° C. Chemical analysis showed the polymer to have the following composition:

|  | Found, percent | Calculated, percent |
|---|---|---|
| Chlorine | 38.3 | 38.4 |
| Carbon | 38.8 | 39.0 |
| Hydrogen | 5.75 | 5.45 |
| Oxygen (by difference) | 17.15 | 17.15 |

The solid polymer was molded into a clear film, which was then oriented by stretching, under water at 70° C., up to the limit of easy stretch, about 150 percent. The oriented film had a tensile strength of 16,700 pounds per square inch at room temperature.

*Example 2*

A charge of 200 grams of epichlorohydrin containing 6 percent by weight of a ferric chloride-propylene oxide complex prepared as in Example 1, was heated in a stainless steel vessel equipped with a condenser. The temperature was carefully regulated at 100° C. for 64 hours. The charge was still liquid at the end of the run, but solidified to a hard brown resin upon being cooled to room temperature. This material was warmed under vacuum to remove volatile matter. The residue, weighing 194 grams, was then dissolved in 5 volumes of hot 1,4-dioxane and acidified with concentrated hydrochloric acid. The crude product was then treated as in Example 1 to isolate a white fluffy solid polymer weighing 40.5 grams. The polymer was molded into a film and oriented by stretching in warm water.

*Example 3*

A polymerization charge of 40 grams of epichlorohydrin, 10 grams of propylene oxide, and 2 grams of ferric chloride-propylene oxide complex was mixed with 30 grams of n-hexane and the mixture was heated in a sealed stainless steel bomb at 80° C. for 360 hours. The vessel was then cooled to room temperature, opened, and the solvent and unreacted monomers were removed by application of heat and vacuum. There was obtained 36.3 grams of a soft, tacky solid. This material was dissolved in hot acetone, acidified with concentrated hydrochloric acid, and treated as in Example 1 to isolate the solid polymer. Chemical analysis showed this material to contain 30.7 percent chlorine. The calculated percent chlorine in a co-polymer containing 80 percent epichlorohydrin and 20 percent propylene oxide is 30.68 percent.

A total of 9.6 grams of solid polymer was obtained, representing a yield of 26.5 percent, based on a conversion to polymeric products of 72.6 percent. The softening point of the polymer was 100° to 105° C. When molded into a film and oriented as in Example 1, the polymer had a tensile strength at room temperature of 4850 pounds per square inch.

*Example 4*

A series of copolymerizations with epichlorohydrin with other olefin oxides was carried out using as catalyst a ferric chloride-propylene oxide complex prepared as in Example 1. In all cases the concentration of catalyst was 4.0 percent by weight of the total monomeric material, and copolymerization was carried out for 94 hours at 80° C. In every instance the solid copolymer was isolated from the crude reaction product by the crystallization procedure of Example 1 and found to have a melting point above 100° C. Each was stabilized by mixing with 1 to 2 percent by weight of 2,2-methylene bis(4-methyl-6-tertiary butyl phenol). Each copolymer was molded into a film, which was then oriented by stretching, as in Example 1.

The following table gives the identity and proportion of the comonomer in percent by weight (balance being epichlorohydrin), the yield of solid copolymer, and the tensile strength (pounds per square inch) of the oriented film.

| Comonomer | Percent | Yield | Film Strength |
|---|---|---|---|
| Propylene Oxide | 20.0 | 23.0 | 5,000 |
| Mixed Epoxybutanes | 20.0 | 22.0 | 9,850 |
| Styrene Oxide | 20.0 | 11.1 | 2,000 |

*Example 5*

A charge of chloropropylene oxide and 1.9 percent by weight of ferric hydroxide was heated in a closed vessel at 80° C. for 168 hours. By recrystallization from acetone, purified solid polychloropropylene oxide was separated.

What is claimed is:

1. A solid polymeric resin composed of polymeric vicinal epoxides and containing at least 80% by weight of polymerized epichlorohydrin, the degree of polymerization being sufficiently high that the melting point is above 100° C.

2. A resin according to claim 1 having intrinsic viscosities of 0.40 to 0.65, measured in 1,4-dioxane at 75° C.

3. A solid homopolymer of epichlorohydrin having a melting point above 120° C. and an intrinsic viscosity greater than 0.55, measured in 1,4-dioxane at 75° C.

4. A solid crystalline resin composed of copolymerized vicinal epoxides and containing in combined form at least 80% by weight of epichlorohydrin and up to 20% by weight of another oxide selected from the class consisting of ethylene oxide, propylene oxide, butylene oxide, and styrene oxide, the degree of polymerization being sufficiently high that the melting point is above 100° C.

5. A resin according to claim 4 in which the other combined oxide is styrene oxide.

6. A resin according to claim 4 in which the other combined oxide is propylene oxide.

7. A resin according to claim 4 in which the other combined oxide is an epoxybutane.

8. As a new article of manufacture, a film of a solid polymeric resin composed of polymerized vicinal epoxides and containing at least 80% by weight of polymerized epichlorohydrin, the degree of polymerization of which is sufficiently high that the melting point of the product is above 100° C., said film having been stretched to a degree sufficient to exhibit crystalline orientation in the plane thereof.

9. A film of a homopolymer of epichlorohydrin, having a melting point above 120° C., stretched to a degree sufficient to exhibit crystalline orientation in the plane of the film.

10. As a new article of manufacture, a film of a solid crystalline resin composed of copolymerized vicinal epoxides and containing in combined form at least 80% by weight of epichlorohydrin and up to 20% by weight of another oxide selected from the class consisting of ethylene oxide, propylene oxide, butylene oxide, and styrene oxide, the degree of polymerization being sufficiently high that the melting point is above 100° C., said film having been stretched to a degree sufficient to exhibit crystalline orientation in the plane thereof.

11. A solid polymeric resin composed of polymerized vicinal epoxides and containing at least 80% by weight of polymerized epichlorohydrin, the degree of polymerization being sufficiently high that the melting point of the resin is above 100° C. stabilized against decomposition by having incorporated therein a small proportion of an antioxidant.

12. A solid homopolymer of epichlorohydrin having a melting point above 120° C. stabilized against decomposition by having incorporated therein approximately 0.5 to 2 percent of an antioxidant of the class consisting of phenols and aromatic amines.

13. A composition according to claim 12 wherein the antioxidant is 2,2' - methylene bis(4 - methyl - 6 - tertiary butyl phenol).

14. A film of the composition defined in claim 12 stretched to a degree sufficient to exhibit crystalline orientation in the plane of the film.

References Cited in the file of this patent

UNITED STATES PATENTS

| | | |
|---|---|---|
| 1,976,678 | Wittwer | Oct. 9, 1934 |
| 2,706,181 | Pruitt et al. | Apr. 12, 1955 |
| 2,706,182 | Pruitt et al. | Apr. 12, 1955 |
| 2,706,189 | Pruitt et al. | Apr. 12, 1955 |

FOREIGN PATENTS

| | | |
|---|---|---|
| 259,431 | Great Britain | Oct. 14, 1926 |
| 477,843 | Great Britain | Jan. 3, 1938 |